United States Patent
Nam et al.

(10) Patent No.: US 6,893,481 B2
(45) Date of Patent: May 17, 2005

(54) METHOD FOR MANUFACTURING NI-AL ALLOY POWDERS FOR FUEL CELLS USING ALUMINUM CHLORIDE

(75) Inventors: Suk Woo Nam, Seoul (KR); Anatoli Maganiouk, Seoul (KR); Seong-Ahn Hong, Seoul (KR); In-Hwan Oh, Seoul (KR); Tae Hoon Lim, Seoul (KR); Heung Yong Ha, Seoul (KR); Sung Pil Yoon, KyungKee-Do (KR); Jonghee Han, Seoul (KR); Eun Ae Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/696,518

(22) Filed: Oct. 29, 2003

(65) Prior Publication Data

US 2004/0221684 A1 Nov. 11, 2004

(30) Foreign Application Priority Data

May 6, 2003 (KR) ................................ 10-2003-0028653

(51) Int. Cl.[7] .................................................. B22F 1/00
(52) U.S. Cl. .......................................... 75/351; 75/367
(58) Field of Search ........................ 75/351, 367, 255; 427/229, 253

(56) References Cited

U.S. PATENT DOCUMENTS

| | | | | | |
|---|---|---|---|---|---|
| 3,291,642 | A | * | 12/1966 | Kroeger et al. | 429/45 |
| 3,535,103 | A | * | 10/1970 | Whitfield | 75/351 |
| 5,312,580 | A | * | 5/1994 | Erickson et al. | 419/2 |
| 5,458,847 | A | * | 10/1995 | Hu | 419/61 |
| 6,699,305 | B2 | * | 3/2004 | Myrick | 75/351 |

* cited by examiner

*Primary Examiner*—Ngoclan T. Mai
(74) *Attorney, Agent, or Firm*—Ohlandt, Greenley, Ruggiero & Perle L.L.P.

(57) ABSTRACT

In a method for manufacturing Ni—Al alloy powders for electrode materials of fuel cells, in which, using aluminum chloride ($AlCl_3$) as a catalyst, powders of Ni and Al, that have been used as electrode materials, are chemically reacted with each other to diffuse the Al into the Ni powders, so that Ni—Al alloy powders can be manufactured at a low temperature below fusion points of Ni and Al while maintaining a shape and a size of the existing Ni powders as they are, thus providing a manufacturing process of Ni—Al alloy powders that is simple, economical, compatible in working, and ready for scale-up, and in which a conventional manufacturing process of electrode based on Ni is used as it is, so that large sized electrode is manufactured.

2 Claims, 2 Drawing Sheets

METHOD FOR MANUFACTURING NI-AL ALLOY POWDERS FOR FUEL CELLS USING ALUMINUM CHLORIDE

BACKGROUND OF THE INVENTION

Field of the Invention

The present invention relates to a method for manufacturing Ni—Al alloy powders for electrode materials of fuel cells, more particularly to a method for manufacturing Ni—Al alloy powders for electrode materials of fuel cells, in which, using aluminum chloride ($AlCl_3$) as a catalyst, powders of Ni and Al, that have been used as electrode materials, are chemically reacted with each other to diffuse the Al into the Ni powders, so that Ni—Al alloy powders can be manufactured at a low temperature below fusion points of Ni and Al while maintaining a shape and a size of the existing Ni powders as they are, thus providing a simple, economical and large-scale manufacturing process for alloy powder production.

Also, the present invention relates to Ni—Al alloy powders for fuel cells, which are manufactured by the method so that structural changes are overcome even under a high temperature sintering and an oxidation atmosphere, thus improving stability and anti-oxidizing property of the material while maintaining reactivity thereof as they are.

In case of a high temperature fuel cell operating at a temperature of above 500° C., such as MCFC and SOFC, Ni is generally used as an electrode material. For example, in MCFC, porous Ni is used as an anode and NiO (oxidized Ni) is used as a cathode. Also, in SOFC, a cermet in which Ni is mixed with electrolytic material such as zirconia or ceria and the like is used as an anode.

A serious problem in the anode where an oxidation reaction of fuel is occurred is that, under an operating condition of high temperature and heavy load of above 2 $kg/cm^2$, a sintering and a creep are caused so that porosity is reduced and a micro-structural deformation such as shrinkage is generated, degrading performance thereof.

That is to say, Ni electrode adapted to high temperature fuel cell is manufactured to have porous structure in order to enlarge reactive area of the electrode and to provide a gas passage way, but, if Ni electrode is used at a high temperature for a long time, it has defects in that surface area and reaction rate thereof are reduced. Also, if a fuel cell stack in which many sheets of unit cells are laminated one after another is operated for a long time, a creep is caused in the porous Ni electrode by a load of the fuel cell, causing a defect of performance reduction.

Generally known in the art, a method using alloys of Ni-10 wt % Cr and Ni-5 wt % Al as electrode materials has been adapted to a Molten Carbonate Fuel Cell (MCFC), and a method using Ni mixed with electrolytic ceramic powders has been adapted to a Solid Oxide Fuel Cell (SOFC).

It has been reported that the modulus of strain of conventional Ni-10% Cr anode by creep is around 10%, but $LiCrO_2$ formed on the surface is dissolved in the electrolyte to weaken resistance to sintering and creep when operated long time. As a result, in order to improve a feature of creep, after the middle of 1980s, there have been studied a method of oxide dispersion strengthened (ODS) in which metal oxide including alumina is dispersed over the Ni electrode, and other methods using Ni—Al or Ni—Cr alloy as an anode, the alloy containing small quantities of Al or Cr that is preferentially oxidized relative to Ni.

ODS method had an effect in improvement of creep feature, but also had a limit in manufacturing an electrode having proper mechanical strength and electric conductivity.

Meanwhile, the method using an alloy electrode is a method which has the same concept as the ODS method and which is proposed to solve the problem in degradation of mechanical strength and electric conductivity by previously dispersing Al or Cr, which will be oxidized during a manufacturing process of an electrode or during an operation, over the Ni substrate so that the produced oxides distribute over inside and outside of the substrate and the surface thereof. Known as best material among the alloy electrodes is Ni—Al alloy electrode, which has below 0.5% of the creep strain rate so that, even in 1 $m^2$, the size of commercial electrode, an increase of contact resistance is very slight.

There has been widely used a method for manufacturing Ni—Al alloy powders, in which Ni and Al are sprayed through a nozzle after mixed and fused. However, the spraying method for manufacturing fine powders of Ni—Al alloy further requires a screening process for classifying according to particle sizes because the particle size distribution of powders manufactured is wide. Furthermore, a porous electrode for fuel cells should have the porosity of above 50%, so that it is advantageous to use a chain type Ni particle as shown in FIG. 1. However, since the particle manufactured by the spraying method has a spherical shape, the spraying method is not proper. Also, the spraying method has the problems in that Ni—Al alloy electrode manufactured by the method has a higher price than the existing materials and that it is hardly sintered by a conventional manufacturing process for an electrode.

SUMMARY OF THE INVENTION

Accordingly, the present invention has been made to solve the above-mentioned problems occurring in the prior art, and an object of the present invention is to provide a method for manufacturing Ni—Al alloy powders for electrode materials of fuel cells, in which, using aluminum chloride ($AlCl_3$) as a catalyst, powders of Ni and Al, that have been used as electrode materials, are chemically reacted with each other to diffuse the Al into the Ni powders, so that Ni—Al alloy powders can be manufactured at a low temperature below fusion points of Ni and Al while maintaining a shape and a size of the existing Ni powders as they are, thus providing a manufacturing process of Ni—Al alloy powders that is simple, economical, compatible in working, and ready for scale-up, and in which a conventional manufacturing process of electrode based on Ni is used as it is, so that large sized electrode is manufactured.

There is provided another object to provide Ni—Al powders for fuel cells, which are manufactured by the method so that structural changes are overcome even under a high temperature sintering and an oxidation atmosphere, thus improving stability and anti-oxidizing property of the material while maintaining reactive activity thereof as they are.

In order to accomplish the above object, there is provided a method for manufacturing Ni—Al alloy powders for fuel cells using aluminum chloride, the method comprising the steps of:

(a) mixing Al powders with Ni powders; and (b) supplying gas containing catalystic $AlCl_3$ to the mixed powders of the step (a) at a temperature of below fusion points of Ni and Al to chemically react Ni and Al with each other, thus forming Ni—Al alloy powders.

According to one embodiment of the present invention, the gas containing catalystic $AlCl_3$ is any one of He, Ar, $H_2$ and $N_2$.

In order to accomplish another object, there is provided Ni—Al alloy powders for fuel cells, which are manufactured by the method described above.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
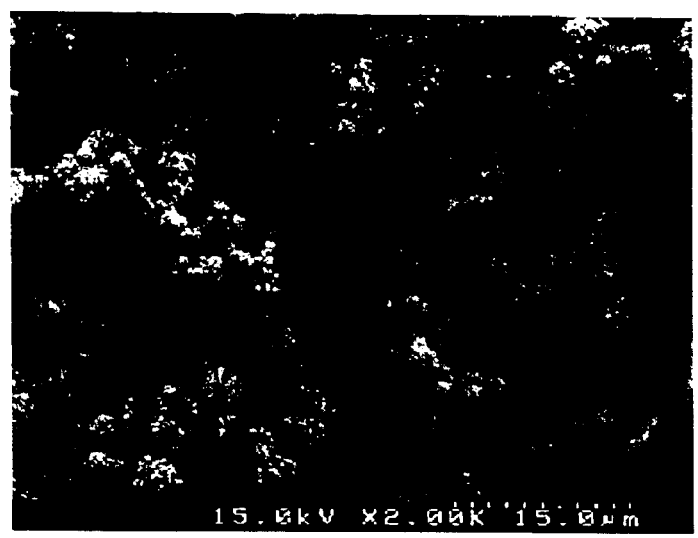
FIG. 1 is a photograph of Ni powders used in an electrode material of fuel cells of the prior art.

Hereinafter, a preferred embodiment of the present invention will be described with reference to the accompanying drawings.

According to the present invention, Ni—Al alloy powders are manufactured by chemically reacting mixed powders of Ni and Al, which have been used as an electrode material, with each other using volatile $AlCl_3$ with high steam pressure and with relative high reactivity as a catalyst thus to diffuse Al into Ni powders.

That is to say, mixed powders of Ni and Al are chemically reacted with each other during being heated while the gas containing catalystic $AlCl_3$ is supplied to mixed powders, so that Ni—Al alloy maintaining the shape and size of Ni constant is manufactured through diffusion of Al into Ni powders.

A principle of chemical reaction generated in the present invention will be described as follows.

Ni—Al alloy is manufactured by a solid-gas-solid surface reaction as in the following equation 1 at a temperature of below fusion point of Al by mixing powders of Ni and Al with each other, and heating the same under a gas atmosphere, such as $H_2$, containing $AlCl_3$ gas.

[Scheme 1]

  (1)

  (2)

  (3)

  (4)

  (5)

  (6)

As shown in Scheme 1, solid Al is reacted with $AlCl_3$ gas to produce $AlCl_2$ or $AlCl$. $AlCl_2$ produced is reacted in turn with Al to produce $AlCl$, or directly reacted with Ni to produce Ni—Al alloy. $AlCl$ produced is directly reacted with Ni to produce Ni—Al alloy.

Ni—Al alloy is firstly formed on the surface of Ni powder. Herein, since Ni—Al intermetallic compound is thermodynamically stable phase according to a Ni—Al binary system diagram, reactions (1) to (6) in Scheme 1 are continued at the surface of Ni powder, while Al chemically reacted with Ni is diffused into Ni powder until it is exhausted.

Hereinafter, a construction and effect thereby of the present invention will be described in detail with reference to an embodiment Although the following embodiment illustrates contents of the present invention, the present invention should not be limited to the embodiment.

Embodiment 1

In this embodiment, Ni—Al alloy powders are manufactured by the following method.

First, powders of Ni and Al are weighed corresponding to Ni—Al alloy composition to be manufactured, and mixed with each other in a rotating drum for 1 hour. After mixed powders of Ni and Al are put into a reactor while being contained in a dish of quartz or pyrex, pressure in the reactor is drawn to vacuum and inert gas is repeatedly injected two or three times so that purging of $AlCl_3$ required for the reactions (1) to (6) in Scheme 1 becomes to be facilitated. Although high purity He or Ar can be generally used as inert gas, hydrogen is used in this embodiment. The reactor is heated at constant rate so that a temperature in the reactor may be maintained at 280° C. while purging of hydrogen is done in the reactor for 6 hours.

For the reactions (1) to (6) in Scheme 1, hydrogen should be supplied to the reactor in which powders of Ni and Al are put, together with $AlCl_3$. Since $AlCl_3$ is gasified even at an atmospheric pressure and its partial pressure at 185° C. is 1 bar, at a vaporizer maintaining 135° C., $AlCl_3$ is gasified sufficiently to be required for the reactions (1) to (6) in Scheme 1. Hydrogen is passed through $AlCl_3$ vaporizer, mixed with $AlCl_3$, and then injected into the reactor. Herein, in order to prevent vaporized $AlCl_3$ from being solidified again, a temperature of a connecting portion between $AlCl_3$ vaporizer and the reactor is maintained at 200 to 220° C.

If hydrogen mixed with $AlCl_3$ is injected into the reactor while maintaining a temperature of the reactor at 280° C. after the reactor has been heated up to 280° C. during purging of hydrogen for 6 hours, the reactions (1) to (6) in Scheme 1 are proceeded. Although the temperature of 280° C. is not a high temperature sufficient to diffuse Al into Ni powder, an initial temperature of the reactor is maintained at 280° C. in order to prevent Ni powder from being sintered.

Since $AlCl_3$ is reacted with oxygen or water to produce $Al_2O_3$ or $AlClO_2$ and to be deposited on the surface of the metal powder because of its high reactivity, oxygen or water should be completely removed from $AlCl_3$ gas supplied to the reactor so as to prevent that phenomenon.

When a part of Ni—Al alloy has been produced on the surface of Ni powder through a reaction at 280° C. for 3 hours, a temperature of the reactor is raised according to Ni—Al alloy composition step by step up to 430° C. in case of such as Ni-3 wt % Al alloy and up to 630° C. in case of such as Ni-5 wt % Al alloy and a final stage of the temperature is maintained for three hours, so that Al is sufficiently diffused into Ni powder, reacting all Al with Ni.

When the reaction has been completed, supply of $AlCl_3$ is stopped, and the reactor is cooled while purging of hydrogen until the temperature of the reactor is lowered to 200° C. in order to prevent an oxidation of Ni—Al alloy powders.

A specific manufacturing condition of Ni-3 wt % Al alloy powders is as follows.

194 g Ni powders (Inco 255) and 6 g Al powders (Alfa Aesar 41001; spherical shape; 10 to 14 μm) are put into a rotating drum and mixed with each other for 1 hour. Mixed powders are put into a flat electric furnace while being contained in a petri dish (pyrex; a diameter of 140 mm; a height of 20 mm), sealed using Grafoil gasket, and heated up to 280° C. while purging of hydrogen gas for 6 hours.

Figure 2:
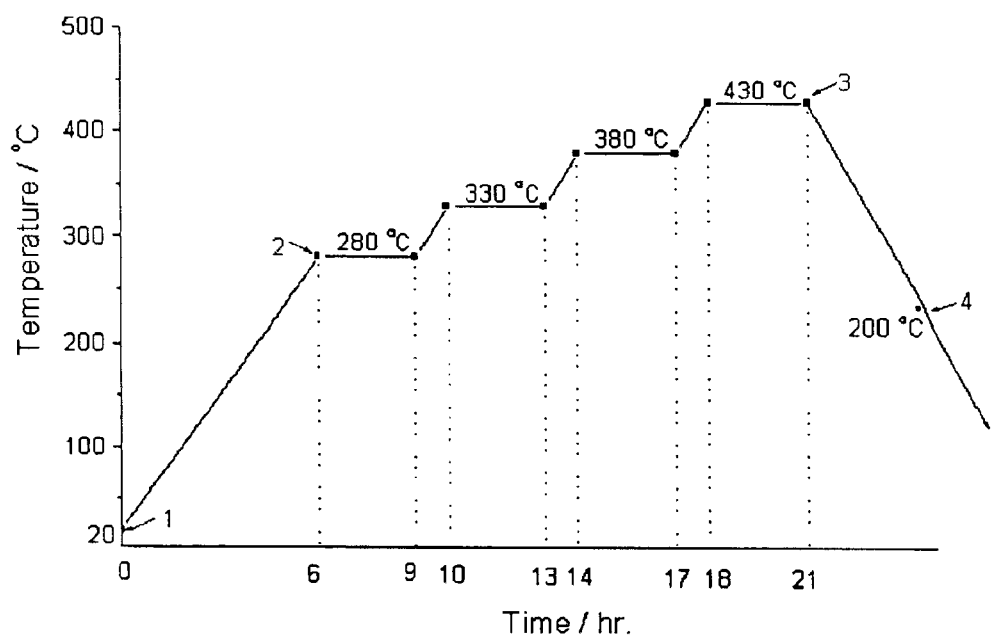
FIG. 2 is a graphical representation showing a temperature and gas supply in a reactor according to a time in a manufacturing process of Ni—Al alloy powders of one embodiment of the present invention.

12 g $AlCl_3$ particles (Junsei Chemical Co., 18070-1201) are gasified while being maintained in a heating jacket at 135±2° C., the particles being contained in a flow-through test tube. The reactor is maintained at 280° C. for 3 hours while supplying $AlCl_3$ and hydrogen gas, and then heated up to 430° C. as is shown in FIG. 2. After maintained at 430° C. for 3 hours, supply of $AlCl_3$ is stopped and the reactor is cooled. When the temperature of the reactor reaches 200° C., supply of hydrogen gas is stopped and the reactor is cooled.

Figure 3:
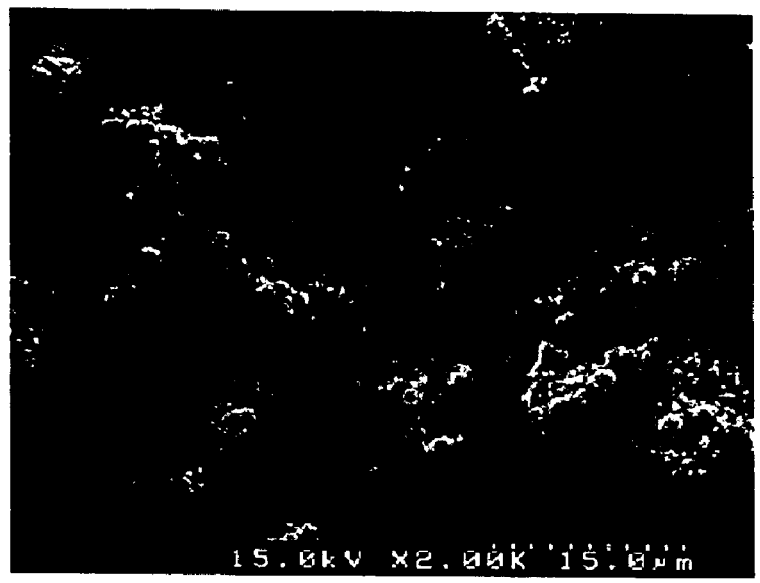
FIG. 3 is a photograph of Ni—Al alloy powders manufactured using aluminum chloride according to the present invention.

Although Ni—Al alloy powders manufactured by the above-mentioned method has been sintered partially comparing with the Ni powders before the reaction, if they are put into the rotating drum together with a milling ball and then ground, the shape and size thereof become to be similar to Ni powders before the reaction, as is shown in FIG. 3. Also, through an analyzing method such as XRD, etc., it has been proved that Al is completely reacted, thus producing Ni—Al alloy.

As described above, there is provided a method for manufacturing Ni—Al alloy powders for electrode materials of fuel cells, in which, using aluminum chloride ($AlCl_3$) as a catalyst, powders of Ni and Al, that have been used as electrode materials, are chemically reacted with each other to diffuse the Al into the Ni powders, so that Ni—Al alloy powders can be manufactured at a low temperature below fusion points of Ni and Al while maintaining a shape and a size of the existing Ni powders as they are.

Also, there is provided Ni—Al powders for fuel cells, which are manufactured by the method so that structural changes are overcome even under a high temperature sintering and an oxidation atmosphere, thus improving stability and anti-oxidizing property of the material while maintaining reactivity thereof as they are, whereby Ni—Al powders are adapted for manufacturing high performance fuel cells.

Also, there is provided a method for manufacturing Ni—Al alloy powders that is economical, compatible in working, and ready for scale-up, and in which a conventional manufacturing process of electrode based on Ni is used as it is, so that large sized electrode is manufactured.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for manufacturing Ni—Al alloy powders for fuel cells using aluminum chloride, the method comprising the steps of:

(a) mixing Al powders with Ni powders; and (b) supplying gas containing catalystic $AlCl_3$ to the mixed powders of the step (a) at a temperature of below fusion points of Ni and Al to chemically react Ni and Al with each other, thus forming Ni—Al alloy powders.

2. A method for manufacturing Ni—Al alloy powders for fuel cells using aluminum chloride as claimed in claim 1, wherein the gas containing catalystic $AlCl_3$ is selected from the group consisting of He, Ar, $H_2$, $N_2$, and any combinations thereof.

* * * * *